United States Patent
Beyer

(10) Patent No.: US 9,547,072 B2
(45) Date of Patent: Jan. 17, 2017

(54) WEATHER RADAR

(71) Applicant: Selex ES GmbH, Neuss (DE)

(72) Inventor: Stefan Beyer, Dusseldorf (DE)

(73) Assignee: Selex ES GMBH, Neuss (DE)

( * ) Notice: Subject to any disclaimer, the term of this patent is extended or adjusted under 35 U.S.C. 154(b) by 270 days.

(21) Appl. No.: 14/264,783

(22) Filed: Apr. 29, 2014

(65) Prior Publication Data

US 2014/0327570 A1    Nov. 6, 2014

(30) Foreign Application Priority Data

May 2, 2013    (EP) .................................... 13002347

(51) Int. Cl.
  *G01S 7/40*    (2006.01)
  *G01S 13/95*    (2006.01)

(52) U.S. Cl.
  CPC ............ *G01S 7/4021* (2013.01); *G01S 7/4052* (2013.01); *G01S 13/95* (2013.01); *G01S 13/951* (2013.01); *G01S 2007/4069* (2013.01)

(58) Field of Classification Search
  CPC .................. G01S 2007/406; G01S 2007/4069; G01S 7/4021; G01S 7/4052; G01S 13/95–13/951
  See application file for complete search history.

(56) References Cited

U.S. PATENT DOCUMENTS

| 7,495,599 | B2 | 2/2009 | Andersson et al. |
| 8,004,458 | B2 | 8/2011 | Walker |
| 2011/0150063 | A1* | 6/2011 | Suzuki .................. G01S 7/4021 375/224 |

FOREIGN PATENT DOCUMENTS

| DE | 102011012843 A1 | 6/2012 |
| WO | WO2011/001206 A1 | 1/2011 |
| WO | WO2012/139029 A1 | 10/2012 |

* cited by examiner

*Primary Examiner* — Matthew M Barker
(74) *Attorney, Agent, or Firm* — Kilpatrick Townsend & Stockton LLP

(57) ABSTRACT

Weather radar for measuring radar signals in the GHz range with a receiver containing at least one signal path, the receiver comprising a receiving facility for an incoming radar signal, on which a test signal generated by a test signal generator is superimposed in a coupler, and a processing device to amplify, filter and convert both signals to lower frequencies, wherein for filtering a matched filter is provided, and with an evaluation device in which calibration parameters of the signal path are derived from the test signal for the frequency of the test signal in order to determine the signal strength of the received radar signal, wherein the test signal is superimposed with at least one frequency differing from the frequency of the radar signal, so that the radar signal and the test signal are processed separately from one another by the evaluation device, and the calibration parameters of the signal path for the frequency of the radar signal are determinable from the test signal through a modeling of the frequency dependence of the calibration parameters for frequencies around those of the radar signal.

13 Claims, 5 Drawing Sheets

WEATHER RADAR

BACKGROUND OF THE INVENTION

The invention relates to a weather radar for measuring radar signals in the GHz range.

Weather radars transmit high-power microwave pulses and measure the strength of the signal that is backscattered by rain or other targets. The rain quantity, for example, can then be estimated from the signal strength. A calibration of the weather radar and, in particular, its receiver is required for this purpose.

From WO 2011/001206 A1 a multichannel receiver system is known allowing for automatic gain calibration by relating the amplitude of a reference signal before coupling it into a receiving path and the amplitude of the reference signal comprised in an output signal of the receiving path and eliminating or reducing changes in conversion gain.

DE 10 2011 012 843 A1 relates to a driver assistance device for a vehicle having a radar unit for detecting a measured variable which determines a frequency-dependent correction quantity for correcting the measured variable.

A polarimetric weather radar system is known from U.S. Pat. No. 7,495,599 B2 which calibrates the signal paths of the two different polarizations by coupling a low-energy test signal at a frequency equal to the radar frequency into both signal paths. The differences in the measured values resulting at the outputs of the two signal paths are then stored as calibration parameters so that the subsequent digital signal processing can take account of and eliminate the difference in the signal paths for real radar signals. The calibration can be carried out either on a one-off basis with a continuous-wave test signal, wherein the antenna signal must be blocked for the calibration period, or on a pulse-by-pulse basis. In this case, a specific range cell is reserved for the calibration, in which a pulsed test signal is then fed in and received instead of the atmospheric echo. A disadvantage of this calibration method is that the data recording of the weather radar must be interrupted during the calibration or range cells must be blocked and excluded from the operational useful signal processing.

From U.S. Pat. No. 8,004,458 B2, a different polarimetric weather radar is known which feeds a test signal at the radar frequency into the signal paths as well. This test signal can be varied in amplitude and phase and thus allows the simulation of various weather conditions. A test signal that is variable to this extent can be used to test and validate the correct function and calibration of the weather radar receiver. For example, Doppler test signals can be fed in or the complex transfer function of the receiver can be determined over the complete dynamic range. This weather radar also has the disadvantage that the data recording must be interrupted during the calibration or range cells must be blocked and excluded from the operational useful signal processing.

From WO 2012/139029 A1, a further polarimetric radar is known which calibrates the two signal paths in ongoing operation without interrupting the data recording. This is done by identifying individual signals in the recorded raw data which correspond to spherical objects. Since spherical objects have an identical reflection behavior for radar waves of both polarizations due to their symmetry, the two signal paths can be calibrated relative to one another on the basis of their reflection signals. This calibration method has the disadvantage that the two signal paths can only be calibrated relative to one another, so that absolute values for calibration parameters, such as amplification or noise, of the individual signal paths and their time dependence cannot be determined. Due to the thermal drifts of the components used in the signal path, measurements at different times are therefore not comparable.

BRIEF SUMMARY OF THE INVENTION

The object of the invention is therefore to improve the measurement of the signal strength in weather radars.

This object is achieved by the features of claim 1.

A continuous calibration of the signal paths of the receiver is hereby enabled during ongoing operation and for any given antenna positions in a weather radar.

It is furthermore advantageous that the structure of the device for separating the test signal and the radar signal can be designed variably and is based on the requirements of the user.

The weather radar according to the invention may have a splitting device to separate the test signal and the radar signal which feeds the individual signals in parallel to the processing device. An advantage of this embodiment is that the measurement data recording no longer needs to be interrupted or range cells to be blocked in order to calibrate the weather radar. As a result, the calibration parameters of the individual signal paths of the receiver, such as amplification or noise, are continuously determinable during the measurement data recording for any given antenna position. It is furthermore advantageous that time-dependent, direction-dependent and range-dependent changes in the calibration parameters can be monitored and identified, since the calibration parameters are determined for every antenna position and every range gate. It is furthermore advantageous that the comparability of the measurement data over time is improved due to the continuous calibration.

Alternatively, the weather radar may have a switch device to separate the test signal and the radar signal which switches over cyclically between the two signals. An advantage of this exemplary embodiment is that the structure of the receiver is simplified.

Moreover, the at least one frequency of the test signal may be selectable with a frequency offset in relation to the frequency of the radar signal depending on the bandwidth of the processing device of the receiver. This is advantageous in that the frequencies of the test signal are preferably selectable outside the range of variation of the frequency of the radar signal. If the frequency offset is selected as less than 10%, particularly preferably less than 5%, of the radar intermediate frequency, it is thus advantageous that the modeling of the frequency dependence of the calibration parameters is particularly precise, since calibration parameters show only a slight variation in a frequency range of this kind.

According to methods known from the prior art, the calibration parameters, such as amplification or noise, of the signal path can be derived for the frequency of the test signal. In order to calibrate the receiver, the calibration parameters of the signal path must be determined for the frequency of the incoming radar signal from the calibration parameters of the signal path for the frequency of the test signal, since the transmission function of the receiver is not necessarily identical for both signals. This is done according to the invention by modeling the frequency dependence of the calibration parameters, which establishes a relation between the calibration parameters at different frequencies. Various mathematical models can be used in the evaluation device for this purpose.

For example, a constant, frequency-independent model can be used. In this case, the calibration parameters for the test frequency can be taken over as calibration parameters for the radar frequency. This model can preferably be used for a frequency offset $\Delta f$ of, for example, $\Delta f \leq 5\%$ of the radar intermediate frequency, which is small in comparison to the radar intermediate frequency, since the properties of the signal path can hardly be distinguished from one another for frequencies with such a small frequency offset. An advantage of this model is the simplicity of its implementation.

A different model is based on the assumption that the frequency dependence of the calibration parameters is separable from the influences of external conditions. In this case, ratios of the calibration parameters of the signal path for the test frequency and the radar frequency being determined on a one-off basis in a main calibration are constant over time. An advantage of this model is its applicability also to greater frequency offsets $\Delta f$, since it takes account of the transmission function of the processing device.

Further models of the frequency dependence are based on interpolation or extrapolation. The test signal must have at least two frequencies for this purpose. In the simplest case, the test signal consists of two frequencies which differ from the radar frequency, wherein one is above and the other is below the radar frequency. The calibration parameters of the signal path are individually determinable for each of the test signal frequencies. The frequency dependence of the calibration parameters is determinable therefrom through interpolation. The calibration parameters for the radar frequency are then determinable from the interpolated frequency dependence. Furthermore, models are applicable in which interpolation is required between more than two test signal frequencies or in which the radar frequency lies outside the test signal frequencies, so that the frequency dependence of the calibration parameters must also be modeled through extrapolation. An advantage of these interpolation models is that no main calibration needs to be carried out. It is furthermore advantageous that the modeling of the frequency dependence of the calibration parameters is carried out particularly precisely. It is additionally advantageous that the determination of the calibration parameters for at least two test signal frequencies allows a plausibility check on the values obtained. If the calibration parameters for the individual test frequencies are unusually far apart from one another, an error has presumably occurred.

The coupler for feeding in the test signal can also be designed as a diplexer. A diplexer can combine a plurality of signals at different frequencies or divide them into their frequencies. Since the insertion loss of a diplexer is significantly less than that of a coupler, it is advantageous herein that the calibration parameters are more accurately determinable due to smaller attenuation losses in the signal path.

In addition to the usual receiving channels, a weather radar may have a TX sample channel with which the properties of the transmit pulse are measurable. Since the TX sample channel passes through the receiver as a further complete receiver channel on a signal path, it reveals drift characteristics similar to the other receiving channels and can similarly be calibrated according to the invention. An advantage herein is that the comparability of the measured data in the TX sample channel and the other receiver channels over time is improved.

The frequency of the incoming radar signal may be variable over time if, for example, a magnetron transmitter is used in the weather radar. For this reason, the receiver of the weather radar can be designed in such a way that the signal processing within the processing device is adaptable to the altered frequency. Furthermore, the frequency of the test signal can be controlled to follow-up the frequency of the radar signal. An advantage of this design is that weather radars with a magnetron transmitter which enable improved measurements due to their increased transmission power can also be continuously calibrated.

The shape of the test signal may be predefinable by means of the test signal generator. An advantage of this design is that various weather conditions can be simulated using the test signal on the test signal channel and the correct function of the weather radar can thus be checked also for complex signals in ongoing operation.

BRIEF DESCRIPTION OF THE DRAWINGS

Further advantages and designs of the invention can be found in the following description and in the subclaims.

The invention is explained in detail below with reference to the exemplary embodiments shown in the attached figures.

DETAILED DESCRIPTION OF THE INVENTION

Figure 1:
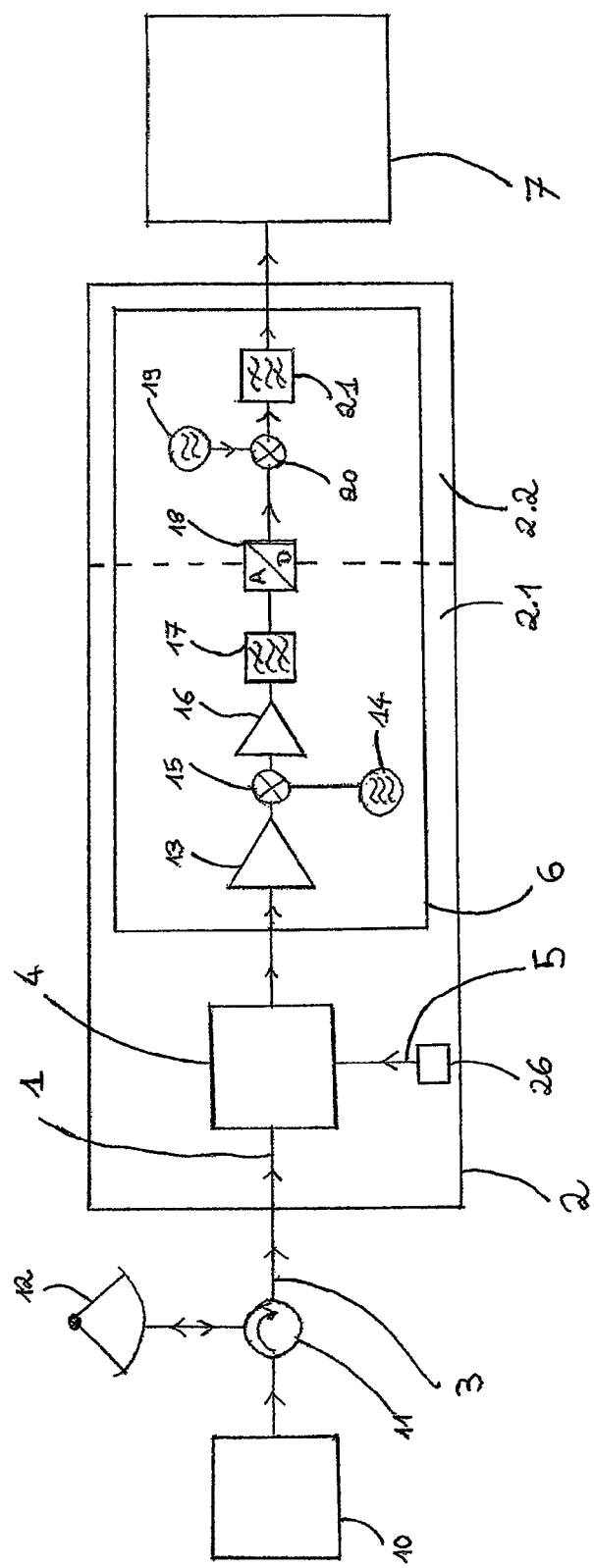
FIG. 1 shows a block diagram of a weather radar according to the prior art.

FIG. 1 shows a block diagram of a weather radar according to the prior art. A radar pulse generated by a transmitter 10 can be fed in a transmission interval via a duplexer 11 to an antenna 12. In the subsequent receiving phase, the backscattered radar signal 3 received from the antenna 12 can be fed by the duplexer 11 to the receiving facility of the weather radar receiver 2.

In the signal path 1 within the receiver 2, a test signal 5 generated by a test signal generator 26 can be superimposed on the radar signal 3 via a coupler 4. According to the prior art, the frequency of the test signal 5 corresponds to that of the radar signal 3. The two superimposed signals 3, 5 can then be fed to the processing device 6 to amplify, filter and convert the two signals 3, 5.

Customary processing steps within the processing device 6 are a pre-amplification of the GHz signal by a low-noise amplifier 13, the conversion of the high-frequency signal into an intermediate frequency in the MHz range using a stable local oscillator (STALO) 14 and a mixer 15, and the amplification and filtering of the intermediate frequency signal by an intermediate frequency amplifier 16 and an anti-alias filter 17. In modern weather radars, the signals are already digitized in the intermediate frequency stage. The analog/digital converter 18 used for this purpose divides the receiver 2 into an analog section 2.1 and a digital section 2.2. The digitized signals can then be converted into the baseband using a digital downconverter (DDC) comprising a numerical oscillator 19 and a further mixer 20 and can be filtered with a matched filter 21. In addition to the aforementioned components, the processing device 6 may contain further components for the signal processing. The signals thus processed can be fed to the evaluation device 7.

The matched filter 21 is an optimal filter which is adapted to the shape of the transmit pulse of the radar signal for an optimum recognition of useful signals in the disturbed fed radar signal 3.

In the evaluation device 7, calibration parameters of the signal path 1, such as, for example, noise and amplification, can be derived from the test signal 5 for the frequency of the test signal 5, which serve to determine the signal strength of the incoming radar signal 3. Since the test signal 5 according to the prior art has the same frequency as the radar signal 3, either the receiving device of the receiver 2 must be blocked during this determination or the antenna 12 must be moved into a position in which no backscattered signals are received so that the radar signal 3 does not influence the measurement of the test signal 5.

Methods for determining the calibration parameters noise and amplification of the receiver 2 can be described as follows.

The receiver 2 contains a signal path 1 for the amplification, filtering and conversion to lower frequencies of the radar signal 3 and the test signal 5. The output signal $S_E$ of a linearly amplifying receiver 2 can be approximately described by $$S_E = V_E \cdot S_A + N,$$

where $V_E$ describes the amplification of the receiver 2, $S_A$ the signal strength of the backscattered radar signal 3 received from an antenna and incoming into the receiver, and N the noise of the output signal. In order to determine the signal strength $S_A$ of the radar signal 3 from the output signal $S_E$ of the receiver 2, the calibration parameters of the signal path 1, $V_E$ and N, must be determined. If a weather radar receiver has a plurality of signal paths, the calibration parameters can assume different values for each individual signal path 1. The signal strength of the incoming radar signal $S_A$ containing the information is determinable from the output signal $S_E$ of the receiver 2 only if all calibration parameters are known.

The noise N can be determined according to the prior art with the "noise-sampling" method. To do this, the antenna 12 is set to a previously determined, inclined position and either the transmitter 10 is stopped or the measurement is limited, with the transmitter 10 in operation, to spatial cells which no longer contain any backscattered signals due to the inclination of the antenna 12. Since the radar signal 3 from the antenna 12 contains no information in both cases ($S_A=0$), the level of the noise N can then be measured directly for a defined period of time ($S_E=N$).

The amplification $V_E$ of the linearly amplifying receiver 2 can be determined through "Single Point Calibration". To do this, a test signal 5 at a frequency corresponding to that of the radar signal 3 and with a selectable signal strength $S_T$ is fed with a coupler 4 into the signal path 1. This coupler 4 can also be designed as a switch with which the input of the receiver 2 to be calibrated is switched over between the radar signal 3 and the test signal 5. If the signal strength $S_T$ of the test signal 5 is selected so great that the noise N of the receiver 2 can be neglected, with a known coupling loss factor $K_T$ of the coupler 4, the relation $S_E \approx V_E \cdot K_T \cdot S_T$ is obtained from which the amplification $V_E$ of the receiver 2 can be calculated. If the receiver 2 contains an analog/digital converter, the signal is already present in digital form at the output of the receiver 2. In this case, the calibration of the amplification can simultaneously be used to normalize the arbitrary digital units to power.

If a non-linearly amplifying (for example logarithmic) receiver 2 is used, a Single Point Calibration is generally not sufficient, but rather the amplification must be calibrated for its entire dynamic range.

According to the prior art, in these methods for determining the calibration parameters of a signal path 1, such as, for example, noise and amplification, the recording of the measurement data must be interrupted for the time period of the calibration. This is done either in a separate calibration phase or in pulse mode by reserving specific range cells, into which the receiving period is divided, for the calibration.

The values of the calibration parameters are dependent on external influences. The noise is composed of the background noise or antenna noise which the weather radar receives and the inherent noise of the receiver 2, characterized by the so-called noise figure. It is therefore dependent, inter alia, on the antenna position, the time of day and the time of year, but also on the temperature. The amplification of the receiver 2 is a time-variable parameter as well which changes, for example, due to thermally caused drifts. Furthermore, the calibration parameters of a signal path 1 depend on the frequency of the signal to be processed. For these reasons, it is necessary to determine the calibration parameters as frequently as possible and for arbitrary antenna positions so that the data recorded at different times and from different spatial directions are comparable.

Figure 2:
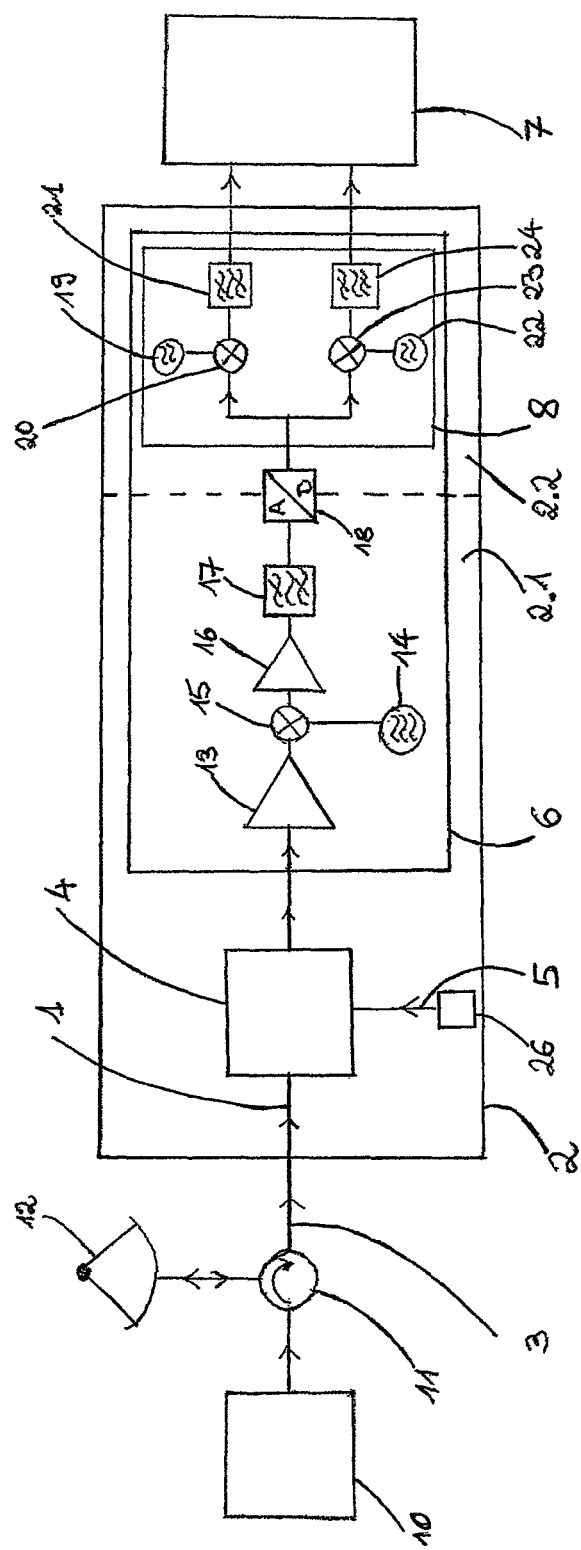
FIG. 2 shows a block diagram of a first exemplary embodiment of the weather radar according to the invention, in which the superimposed signals are separable by means of a splitting device.

The subject-matter of the present invention differs from the prior art outlined above as described below:

FIG. 2 shows a first exemplary embodiment of the weather radar according to the invention. As explained above, a transmitter 10 which generates a radar pulse is provided to measure radar signals in the GHz range. This radar pulse can be fed via a duplexer 11 to an antenna 12. In the subsequent receiving phase, the backscattered radar signal 3 received from the antenna 12 can be fed by the duplexer 11 to the receiving facility. On the at least one signal path 1 within the receiver 2, a test signal 5 generated by a test signal generator 26 can be superimposed on the radar signal 3 via a coupler 4. In contrast to the prior art, a test signal 5 which has at least one frequency different from that of the radar signal 3 can be superimposed on the radar signal 3 in the coupler 4. The radar signal 3 and the test signal 5 can thus be processed separately from one another by the evaluation device 7. The calibration parameters of the signal path 1 can be determined for the frequency of the radar signal 3 from the test signal 5 through a modeling of the frequency dependence of the calibration parameters for frequencies around those of the radar signal 3. This is explained in detail below.

In the simplest case, the test signal 5 has only one frequency $f_T$, which differs by a frequency offset $\Delta f$ from the radar frequency $f_R$, i.e. $f_T = f_R + \Delta f$ or $f_T = f_R - \Delta f$. The radar signal 3, superimposed with the test signal 5, passes through the subsequent processing device 6 of the receiver. After various processing steps, the test signal 5 is again separable from the radar signal 3 within the processing device 6, so that the signals 3, 5 can be processed separately from one another in a subsequent evaluation device 7. The calibration parameters of the signal path 1 are then determinable for the frequency of the radar signal 3 from the test signal 5 in the evaluation device 7 by a modeling of the frequency dependence of the calibration parameters for frequencies around those of the radar signal 3.

Figure 3:
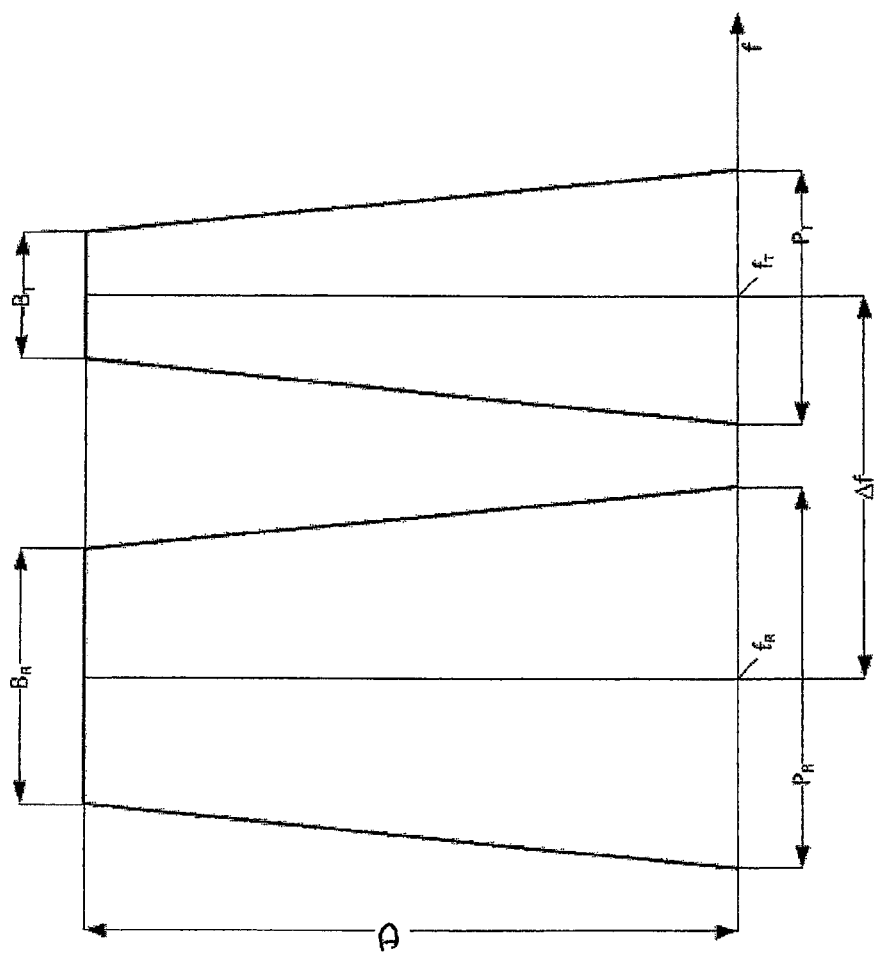
FIG. 3 shows an example of the positioning of the passbands of the filters used to separate the test signal and the radar signal according to exemplary embodiment 1.

To separate the superimposed signals 3, 5, a splitting device 8 is formed within the processing device 6 by implementing a second measurement channel for the frequency of the test signal in the receiver 2 which has a corresponding frequency offset to the main channel at the radar frequency. The signals are preferably separated at the end of the processing device 6 so that all components of the receiver 2 which contribute to its noise and which can drift are comprised. To this end, the data stream of the analog/digital converter 18 is preferably divided up and two digital downconverters are used which comprise numerical oscillators 19, 22 each of which are adjustable in such a way that they convert the radar signal 3 and the test signal 5 using mixers 20, 23 into their respective baseband. The radar signal 3 and the test signal 5 are extracted from the converted signals by the matched filter 21 and the test signal filter 24 respectively and can then be fed separately from one another and in parallel to the evaluation device 7. The filters 21, 24 can alternatively also be implemented between the analog/digital converter 18 and the DDCs. In both cases, the matched filter 21 determines the bandwidth of the radar signal channel and the test signal filter 24 determines the bandwidth of the test signal channel within which the frequencies of the radar signal 3 and the test signal 5 are selectable. The frequencies of the radar signal 3 and the test signal 5 are preferably selected in the range of the center frequencies of the radar channel or the test signal channel. The bandwidths of the channels $B_R$, $B_T$ may be different. In this case, the bandwidth difference should then be taken into account in the evaluation device 7. An example of the positioning of the passbands $P_R$, $P_T$ of the matched filter 21 and the test signal filter 24 and the bandwidths of the channels $B_R$, $B_T$ is shown in FIG. 3 over the dynamic range D of the receiver 2.

In radars, the transmit pulses at the radar frequency $f_R$ have a duration in the microsecond range. The backscattered radar signals 3 therefore have frequencies which lie within a radar signal channel with a bandwidth $B_R$ of the radar frequency $f_R$, as shown in FIG. 3. The matched filter 21, which is adapted to the transmit pulse shape of the radar, has a passband $P_R$ for evaluating the bandwidth $B_R$ of the radar signal channel. As shown in FIG. 3, the frequency of the test signal $f_T$ lies outside the bandwidth of the passband $P_R$ of the matched filter 21.

Figure 4:
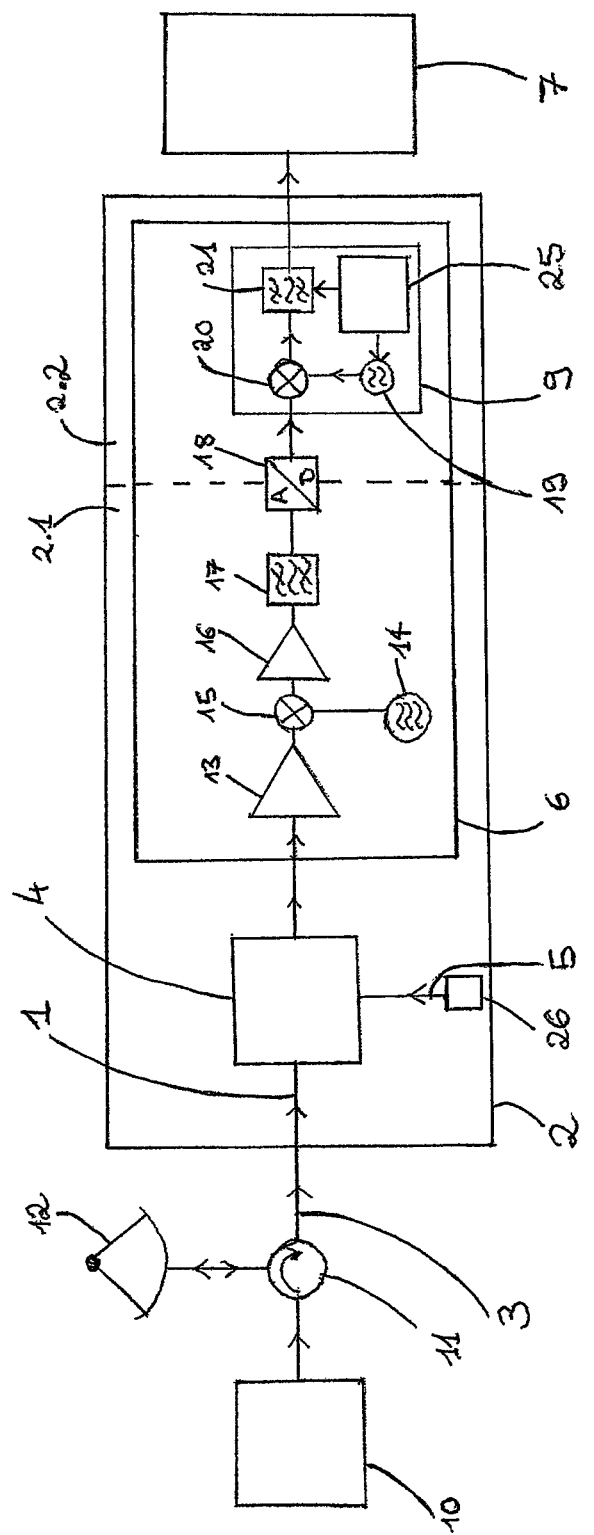
FIG. 4 shows a block diagram of a second exemplary embodiment of the weather radar according to the invention, in which the superimposed signals are separable by means of a switch device.

FIG. 4 shows a second exemplary embodiment of a weather radar according to the invention. With the coupler 4, a test signal 5 at least at one frequency differing from the radar frequency can be superimposed on the radar signal 3. The signals are separated by means of a switch device 9. The frequency of the numerical oscillator 19 is controllable via a frequency switch 25 in such a way that the radar frequency and the at least one test frequency are converted cyclically into the baseband from the superimposed signal. In this embodiment, both signals 3, 5 pass through the same matched filter 21 on the signal path 1. In this way, the signal fed to the evaluation device 7 can be switched over between the test signal 5 and the radar signal 3. If the test signal 5 contains only one frequency differing from the radar frequency, the numerical oscillator 19 must be cyclically detuned for this purpose by the corresponding frequency offset in relation to the radar frequency for the duration of one or more transmit pulses. For the corresponding receive intervals, the test signal 5 is then receivable at the at least one test frequency. The received signals are to be marked as test data, excluded from the operational data processing and used only for the calibration and validation. In this simplified variant, no additional measurement channel is implemented and no additional filter is required. However, the measurement data recording is interrupted during the recording of the test data but the calibration parameters advantageously remain determinable for arbitrary antenna positions and can be available over the entire respective distance range. In other respects, the above explanations of the first exemplary embodiment apply here accordingly.

In an alternative exemplary embodiment (not shown), the structure of the splitting device 8 differs from that of the first exemplary embodiment. In this case, the data stream of the analog/digital converter is not divided up and the superimposed signal is downconverted with a DDC into the baseband of one of the two signals 3, 5. The superimposed signal can then be divided up via parallel filter processing (for example with a low-pass filter and a bandpass filter) into the radar signal 3 and the test signal 5. In this exemplary embodiment also, the radar signal 3 and the test signal 5 can be processed in parallel by the evaluation device 7. If, alternatively instead of a parallel filter processing, the signal fed to the evaluation device 7 is cyclically switchable back and forth between the two filtered signals with a switch, in comparison to the second exemplary embodiment, this arrangement corresponds to an alternative structure of a switch device 9.

The bandwidths of the radar signal and test signal channels are determined by the passbands of the filters 21, 24 used to separate the signals 3, 5. The bandwidths of the two channels may be different. In order to prevent the two signals 3, 5 from interfering with one another in the signal path 1 of the receiver 2, the passbands of the filters 21, 24 must not overlap. The frequencies of the test signal 5 and the radar signal 3 therefore preferably have a frequency offset $\Delta f$ which is greater than the bandwidths of the channels. The maximum magnitude of the frequency offset $\Delta f$ is determined by the bandwidth of the processing device 6 of the receiver 2. The bandwidth of the processing device 6 must be so large that both the radar signal 3 and the test signal 5 pass through the entire processing device 6. The at least one frequency of the test signal 5 therefore preferably has a frequency offset $\Delta f$ in relation to the frequency of the radar signal 3 which is selectable depending on the bandwidth of the processing device 6 and the respectively selected bandwidth of the filter 21. A frequency offset which is less than 10%, particularly preferably less than 5%, of the radar intermediate frequency is preferred.

Various models can be used within the evaluation device 7 to model the frequency dependence of the calibration parameters of the at least one signal path 1.

For frequency offsets $\Delta f$ of less than 5% of the radar intermediate frequency, a model is preferably used in which the frequency dependence of the calibration parameters of the signal path 1 is modeled as being constant between the frequencies of the radar signal 3 and the test signal 5 so that the calibration parameters of the signal path 1 for the test frequency can be taken over as calibration parameters of the signal path 1 for the radar frequency. This model is particularly simple to implement since, in particular, it requires no main calibration and has sufficient precision for small frequency offsets $\Delta f$, since the calibration parameters for frequency offsets $\Delta f$ in this range hardly differ from one another.

For frequency offsets $\Delta f$ of more than 5% of the radar intermediate frequency, a model is preferably used within the evaluation device 7 in which the frequency dependence of the calibration parameters of the signal path 1 is modeled as being independent from external influences, so that ratios formed from the calibration parameters of the signal path 1 for the frequency of the radar signal 3 and the test signal 5 are modeled as being constant over time. This model takes account of the transmission function of the receiver and therefore delivers more precise results for larger frequency offsets compared with the constant calibration parameter model.

The model is based on the assumption that the frequency dependence of the calibration parameters and the dependence on external influences are separable, so that, for example, $N_R(f, T, \ldots) = n_1(f) \cdot n_2(T, \ldots)$ applies to the noise, where $n_1$ is a function of the frequency f and $n_2$ is a function of the temperature T and other external influencing parameters. In this model, the calibration parameters at a test frequency $f_T$ and at the radar frequency $f_R$ have fixed ratios to one another independent from the external conditions, since the dependence on the external parameters is cancelled when taking the ratio. For example, the following is obtained for the noise: $N_R(f_R, T, \ldots)/N_T(f_T, T, \ldots) = n_1(f_R)/n_1(f_T) = R_N$. These ratios are determinable for all calibration parameters on a one-off basis in a main calibration in which the data recording is interrupted in order to determine the calibration parameters for the individual frequencies on the radar channel and test channel according to methods known from the prior art. In the subsequent operational calibration, the respective current values of the calibration parameters for the radar frequency are determinable by multiplying the current calibration parameters for the test frequency with these ratios, i.e., for example, for the noise according to the relation $N_R(f_R, T, \ldots) = R_N \cdot N_T(f_T, T, \ldots)$. Since the calibration parameters for the frequencies of the test signal can be measured continuously, without interrupting the data acquisition, the weather radar can be calibrated continuously in this way in ongoing operation. In order to check the applicability of the model and to adapt the ratios, if necessary, to long-term fluctuations, the main calibration can be repeated at long time intervals (for example monthly). Alternatively, a measurement of the transmission function of the entire transmission range of the receiver 2 is also possible, from which the ratios analogous to $R_N(f_R, f_T)$ are dynamically determinable for all calibration parameters and for any given frequencies $f_R$ and $f_T$ within the transmission range. In this form, this model of the frequency dependence is also applicable to radar systems in which the transmit frequency is not constant (for example if a magnetron transmitter is used).

In order to determine the current receiver amplification for the radar frequency, a ratio $R_V$ can be formed analogously which can be multiplied in the operational calibration by the respective current amplification $V_T$ of the test signal. Alternatively, a ratio of two signal strengths $R_S = S_{ER}/S_{ET}$ can be used for the calibration, said ratio being formed from the signal strengths measured at the output of the receiver obtained in a main calibration when feeding-in a signal with a known level $S_R$ at the radar frequency $f_R$ and a signal with a constant signal level $S_T$ at the test signal frequency $f_T$. The test signal 5 with the constant signal level $S_T$ can be fed in continuously, so that the current calibration factor $S_{ER}$ can be obtained by multiplying $R_S$ by the current value of $S_{ET}$. In order to calibrate the receiver 2, the known coupling loss factor $K_T$ must then furthermore be taken into account in such a way that, if a level $S_R$ at the test signal input of the coupler 4 results in a signal strength $S_{ER}$ at the output of the receiver 2 ($S_{ER} \hat{=} S_R$ at the test signal input), this corresponds to a signal strength $S_R/K_T$ at the radar signal input of the coupler 4 ($S_{ER} \hat{=} S_R/K_T$ at the radar signal input). In this way, the receiver 2 can be calibrated in relation to the radar input gate of the test signal coupler 4.

For a particularly precise determination of the calibration parameters of the signal path 1 for the frequency of the radar signal 3, a test signal 5 can preferably be fed in which has at least two frequencies. A separate test signal channel is implemented in the receiver 2 for each frequency of the test signal 5 so that the calibration parameters of the signal path 1 are determinable for each of these frequencies. Preferably, at least one of the frequencies of the test signal 5 is above and below the frequency of the radar signal 3, respectively. In this embodiment, a model of the frequency dependence of the calibration parameters which models the frequency dependence of the calibration parameters of the signal path 1 through interpolation or extrapolation is preferably used in the evaluation device 7. The calibration parameters of the signal path 1 for the radar frequency are then determinable through interpolation or extrapolation from the continuously and separately determinable calibration parameters of the signal path 1 for the test frequencies. The need for a main calibration is thus eliminated and the possibility arises for a plausibility check through comparison of the calibration parameters obtained from the different test signal channels. Unusually large differences in the calibration parameters on the different test signal channels in this case indicate an incorrect function of the weather radar.

According to one exemplary embodiment (not shown), the feed-in coupler 4 can be designed as a diplexer. A diplexer can combine a plurality of signals at different frequencies or divide them into their frequencies. Its insertion loss is significantly less than that of a coupler.

Figure 5:
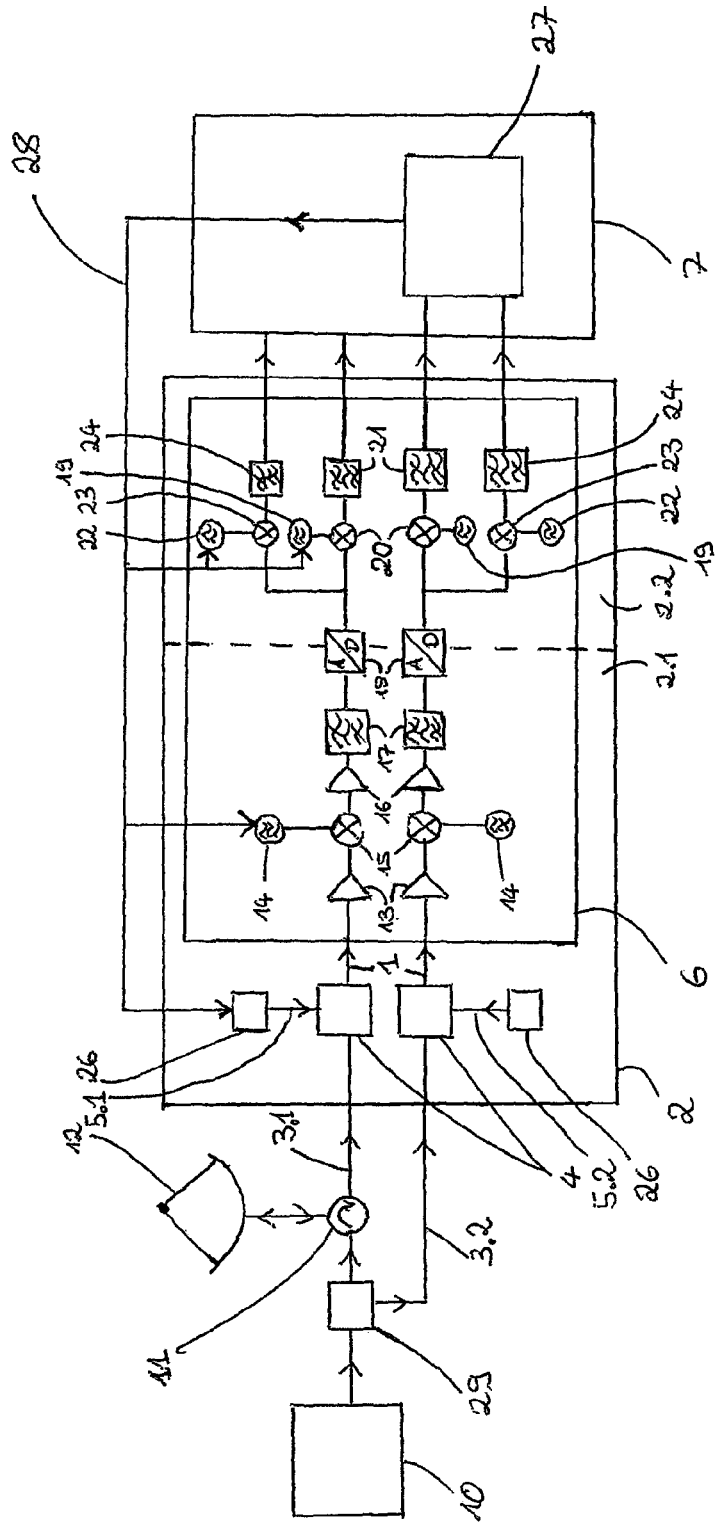
FIG. 5 shows a block diagram of a third exemplary embodiment of the weather radar according to the invention, which has a TX sample channel.

According to a third exemplary embodiment, which is shown in FIG. 5, the weather radar is equipped with a TX sample channel, so that the receiver 2 has an additional signal path 1 for the TX sample channel. Providing a TX sample channel enables the measurement of the frequency, phase and power of each transmit pulse. To this end, the signal of the radar pulse 3.2 to be measured can be coupled out via a coupler 29 in the transmitter line and can be fed to the receiving facility of the receiver 2 separately from the backscattered radar signal 3.1 received from the antenna 12. Since the TX sample channel, being a complete receiver channel, passes through the receiver 2 on a signal path 1, it has drift characteristics similar to those of the other receiving channels and its calibration parameters are determinable according to the invention in ongoing operation as well.

Providing a TX sample channel and its calibration according to the invention are preferred in particular if the weather radar is equipped with a transmitter 10 whose frequency is variable so that the frequency of the radar pulse 3.2 and therefore also that of the incoming radar signal are not constant during operation. This is the case, for example, with a magnetron transmitter. Since a magnetron transmitter is a high-power microwave oscillator whose frequency can be set by means of a cavity resonator, the transmit frequency depends on the temperature of the electron tube used and that of the resonator. Since the temperature changes in ongoing operation, also the transmit frequency is not constant. The signal processing within the processing device 6 is therefore preferably designed as being adaptable to the frequency of the radar signal 3.1 which changes over time. The center frequencies of the radar channel and the test signal channel are designed to be controllable to follow-up according to the transmit frequency of the radar pulse 3.2 for this purpose.

This can be done by means of an Automatic Frequency Control (AFC) function. The current transmit frequency, which is measurable, for example, by means of a TX sample channel, is determinable within the digital receiver 2.2 or in a section 27 of the evaluation device 7 designed for that purpose. Either the frequency of the STALO 14 or the frequency of the numerical oscillator 19 is then controllable via a feedback line 28 in such a way that the position of the radar signal 3 remains within the passband of the matched filter 21, preferably in the range of the latter's center frequency. When the frequency of an external oscillator such as the STALO 14 is adjusted, the radar signal 3.1 is converted to a fixed input frequency of the digital receiver 2.2, whereas the input frequency of the digital receiver 2.2 of the radar signal 3.1 varies in the case of numerical AFC (follow-up control of the numerical oscillator 19). This variation is then to be taken into account cyclically within the digital receiver 2.2 through a corresponding variation of the frequency of the numerical oscillator 19.

In order to prevent an overlap of the passbands of the matched filter 21 and the test signal filter 24 within the bandwidth of the processing device 6, the frequencies of the test signal 5.1 can be controlled to follow-up the frequency of the radar signal 3.1 via a feedback line 28 as well. In the case of numerical AFC, also the frequency of the second numerical oscillator 22 is then correspondingly variable, so that the position of the test signal 5.1 remains within the passband of the test signal filter 24, preferably in the range of the latter's center frequency. If the bandwidth of the processing device 6 is wide enough, the frequency of the test signal 5.1 can be selected outside the range of variation of the frequency of the radar signal 3.1. In this case, the frequency of the test signal 5.1 does not have to be follow-up controlled.

Any shape of the test signal 5 may be predefinable by means of the test signal generator 26. As a result, the test signal channel can be used to simulate weather conditions and the correct functioning of the weather radar in ongoing operation can thus be checked.

In addition, the invention can allow for operational, parallel, for example radiometric, measurements or measurements with external sources for arbitrary antenna positions, which previously was not possible. Thus, for example, reception is possible at the test frequency in addition to the radar frequency without a test signal being fed into the signal path.

Furthermore, different models can be used to model the frequency dependence of the individual calibration parameters of a signal path in the receiver. Thus, for example, the constant frequency dependence model could be used for noise, and an interpolation model could be used for amplification.

The digitization of the radar signal and the test signal can also take place after both signals are converted into the baseband instead of in the intermediate frequency stage of the receiver. In this case, both signals are converted into the baseband by means of a further local oscillator, which performs the functions of the numerical oscillator as an analog component. The analog/digital converter used for the digitization can then be arranged in the baseband stage of the receiver or in the evaluation device.

The invention claimed is:

1. A weather radar for measuring radar signals in the GHz range, the weather radar comprising:
a receiver containing at least one signal path, the receiver comprising a receiving facility configured to receive an incoming radar signal, on which a test signal generated by a test signal generator is superimposed in a coupler;
a processing device configured to amplify, filter and convert both signals to lower frequencies;
a matched filter configured to filter the incoming radar signal;
an evaluation device configured to derive calibration parameters of the signal path from the test signal for the frequency of the test signal in order to determine the signal strength of the received radar signal;
wherein the test signal is mixed with at least one frequency differing from the frequency of the radar signal, so that the radar signal and the test signal are processed separately from one another by the evaluation device, and the calibration parameters of the signal path for the frequency of the radar signal are determined from the test signal through a modeling of the frequency dependence of the calibration parameters for frequencies around those of the radar signal; and
wherein the receiver includes a splitting device configured to separate the test signal and the radar signal from one another and feed the test signal and the radar signal to the evaluation device.

2. The weather radar according to claim 1, wherein the frequencies of the test signal and the radar signal have a frequency offset which may be selected depending on the bandwidth of the processing device.

3. The weather radar according to claim 2, wherein the frequency offset is less than 10% of the intermediate frequency of the radar signal.

4. The weather radar according to claim 1, wherein the processing device converts both signals to intermediate frequencies.

5. The weather radar according to claim 1, wherein the calibration parameters of the at least one signal path are constant in the frequency range between the frequencies of the radar signal and the test signal.

6. The weather radar according to claim 1, wherein the frequency dependence of the calibration parameters of the at least one signal path is modeled as being independent from external influences.

7. The weather radar according to claim 1, wherein the test signal has at least two frequencies, each of which differ from the frequency of the radar signal, and the frequency dependence of the calibration parameters of the at least one signal path is modeled through interpolation or extrapolation of the calibration parameters obtained for the test signal frequencies.

8. The weather radar according to claim 1, wherein the coupler is designed as a diplexer.

9. The weather radar according to claim 1, wherein the receiver has a signal path of a TX sample channel, wherein the TX sample channel is configured to measure the frequency, phase and power of each transmit pulse.

10. The weather radar according to claim 9, further comprising a transmitter configured to produce a time-variable frequency of the radar signal and wherein the signal processing within the processing device is configured to adapt via a feedback line to the frequency of the radar signal changing over time.

11. The weather radar according to claim 10, wherein the transmitter is designed as a magnetron transmitter.

12. The weather radar according to claim 10, wherein the at least one frequency of the test signal is configured to be controlled via a feedback line.

13. The weather radar according to claim 1, wherein the shape of the test signal is predefinable by a test signal generator to simulate weather conditions and to check the correct function of the weather radar.

* * * * *